United States Patent
Hyndman et al.

(10) Patent No.: US 8,146,145 B2
(45) Date of Patent: Mar. 27, 2012

(54) METHOD AND APPARATUS FOR ENABLING ENHANCED CONTROL OF TRAFFIC PROPAGATION THROUGH A NETWORK FIREWALL

(75) Inventors: Arn Hyndman, Ottawa (CA); Nicholas Sauriol, Kanata (CA)

(73) Assignee: Rockstar Bidco LP, New York, NY (US)

( * ) Notice: Subject to any disclaimer, the term of this patent is extended or adjusted under 35 U.S.C. 154(b) by 2414 days.

(21) Appl. No.: 10/955,162

(22) Filed: Sep. 30, 2004

(65) Prior Publication Data

US 2006/0075478 A1  Apr. 6, 2006

(51) Int. Cl.
  *G06F 9/00* (2006.01)
(52) U.S. Cl. .......................................... 726/11
(58) Field of Classification Search .............. 726/11, 726/15, 7, 12; 713/600, 601
  See application file for complete search history.

(56) References Cited

U.S. PATENT DOCUMENTS 5,987,611 A  * 11/1999  Freund ............................. 726/4
6,324,648 B1 * 11/2001  Grantges, Jr. ................... 726/12
6,873,988 B2 *  3/2005  Herrmann et al. ............... 707/10

* cited by examiner

*Primary Examiner* — Ellen Tran
(74) *Attorney, Agent, or Firm* — Anderson Gorecki & Manaras LLP

(57) ABSTRACT

A distributed firewall system is used to implement a network firewall with enhanced control over network traffic to allow policy to be implemented on a per-user basis, a per-application basis, a per-user and application basis, and to allow ports to be dynamically opened and closed as needed by the applications. The distributed firewall system may include application identifiers associated with applications running on a network element, one or more firewall agents instantiated on the network element hosting the applications, and a firewall configured to interface with the firewall agents. Communications between the distributed components are secured to allow the firewall to detect if an agent has been compromised, and to allow the firewall agent to determine if the application has been compromised. The distributed firewall system may work in a VPN environment, such as in connection with a VPN server, to implement firewall policy at the point where VPN traffic enters the protected network.

21 Claims, 4 Drawing Sheets

METHOD AND APPARATUS FOR ENABLING ENHANCED CONTROL OF TRAFFIC PROPAGATION THROUGH A NETWORK FIREWALL

BACKGROUND

1. Field

This application relates to firewalls and, more particularly, to a method and apparatus for enabling enhanced control of traffic propagation through a network firewall.

2. Description of the Related Art

Data communication networks may include various computers, servers, nodes, routers, switches, hubs, proxies, and other devices coupled to and configured to pass data to one another. These devices will be referred to herein as "network elements," and may provide a variety of network resources on the network. Conventionally, data has been communicated through data communication networks by passing protocol data units (such as packets, cells, frames, or segments) between the network elements over communication links on the network. A particular protocol data unit may be handled by multiple network elements and cross multiple communication links as it travels between its source and its destination over the network.

Many applications may be run over the network, and a network operator may wish to provide differential access to the applications based on the type of application, who is running the application, and numerous other factors. This may be accomplished on a personal computer by causing a dedicated firewall to be set up, to allow traffic to be controlled on a per-application basis such that traffic from each application may be monitored to safeguard the computer. Unfortunately, personal firewalls must be installed and administered on every machine, which makes it expensive and time consuming to implement security in this manner on a large network, especially as the network grows and the number of users increases. Additionally, personal firewalls may be alterable by the users or completely eliminated, thus possibly negating the desired security and control to be provided by the firewalls. Finally, personal firewalls are only capable of identifying applications running on the local machine—the type or identity of an application attempting to connect to the local machine from the network can only be inferred by the port(s) or protocol(s) it is using. Thus, personal firewalls may not provide the level of control desired where the firewalls are to be used to control access to network applications.

To address these concerns, it is common to implement one or more network firewalls to secure the network, portions of the network, or application on the network. Network firewalls are able to implement network policy by looking at information available in the header portion of packets or other protocol data units arriving at the firewall. This information may be used to filter traffic, for example based on the destination IP address which specifies where the packet is going, the origination IP address which specifies where the packet originated, and the protocols that are being used to transport the packet. Additionally, firewalls generally are able to filter based on the port over which the packet is to be delivered, which gives some indication to the firewall as to the application associated with the packet, since applications generally use particular ports or ranges of ports to transport traffic on the network.

While network firewalls work well for particular classes of traffic and for certain types of applications, many applications dynamically select communication ports from a range of available ports. To ensure traffic for the application is able to get through the firewall, it is necessary for a traditional firewall to open all ports within the range, even though legitimate traffic may only be using one or a subset of the total number of open ports. This presents a possible security risk since unintended traffic may be allowed to get past the firewall. Other instances exist as well where current network firewall implementations are unable to inspect traffic closely enough or are unable to know sufficiently which traffic should be allowed to be transported on the network. An example of this is the use of HTTP tunneling—a technology where another protocol is carried over HTTP in order to penetrate a firewall configured to allow HTTP traffic. Accordingly, it would be advantageous to have a firewall that is able to exert better control over network traffic.

SUMMARY OF THE DISCLOSURE

A network firewall is provided to enhance control over network traffic to allow policy to be implemented on a per-user basis and a per-application basis in addition to traditional policy controls. This allows enhanced filtering to occur, such as to allow the firewall to control which users are sending traffic through the firewall, which applications are being used by users or groups of users, and to allow ports to be dynamically opened and closed on needed by the applications. According to an embodiment of the invention, a distributed firewall system is provided having a federation of trusted components which cooperatively collect and exchange information about traffic, users, and applications on the network to increase the Firewall's ability to police traffic in a more specific fashion. The federation of trusted components may be formed using digital signatures, authentication mechanisms, encryption, and other mechanisms. The distributed firewall system may be in a virtual private network environment to allow the distributed firewall system to control traffic at the point of entry on the network, such as at the VPN server.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
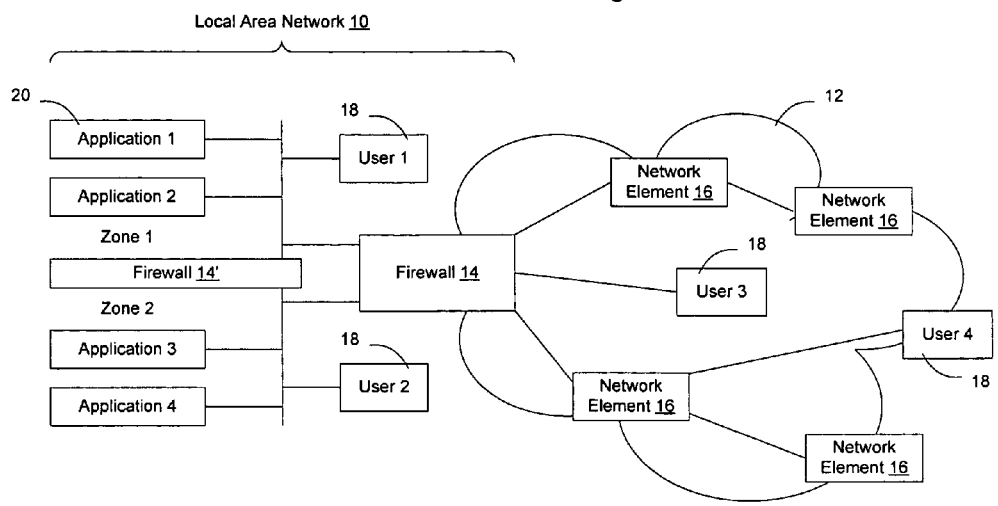
FIG. 1 is a functional block diagram of an example of a communication network according to an embodiment of the invention.

FIG. 1 illustrates an example communication network in which a local area network 10 is connected to an external network 12. A firewall 14 separates the local area network from the external network. Examples of common local area networks include Ethernet networks, token ring networks, and networks formed using other common technologies, although the invention is not limited to any particular type of local area network. The external network 12 may include multiple network elements 16 and may be, for example, a public network such as the Internet or another public and/or private network. The invention is not limited to use of a firewall to connect to any particular type of external network.

The local area network may be broken up into zones by internal firewalls 14' to separate the internal network into discrete areas, and the invention is not limited to a firewall configured to be used to only interface between external and internal networks, but rather extends to firewalls configured to interface between multiple zones of the same network.

Network users 18 may connect to the local area network directly, such as users 1 and 2, or may connect to the local area network over the external network 12, such as users 3 and 4. Network policy may be differently applied to the users depending on the zone in which they connect or if they connect to the local area network over the external network, although other types of policy may be applied as well and the invention is not limited to the particular policy to be implemented by the firewalls.

Applications 20 may be implemented on the local area network or optionally on the external network (not illustrated) to allow particular actions to be taken on the network. Examples of such applications include a File Transfer Protocol (FTP) server configured to allow files to be transferred between users or network elements on the networks, database servers, AAA servers, LDAP servers, and numerous other types of applications. The invention is not limited to use with any particular applications as numerous types of applications are available and continue to be developed. Thus, the invention may be used with any number of applications and should not be construed to be limited to use with these several listed applications or to require the use with these several listed applications.

It may be desirable for particular applications to be available to users within particular zones on the local area network, only available to network users accessing the network from the external network, or available based on other criteria. As discussed in greater detail below, the distributed firewall system enables information to be gathered to allow more accurate traffic determinations to be made and to allow advanced policies to be implemented on the network. Although particular examples of policy may be discussed herein, the invention is not limited to the particular policy to be implemented by the firewall. Thus, examples of policy discussed herein are to be interpreted as illustrative of possible ways of operating the firewall, and are not intended to limit the types of policy that may be implemented on the firewall.

Figure 2:
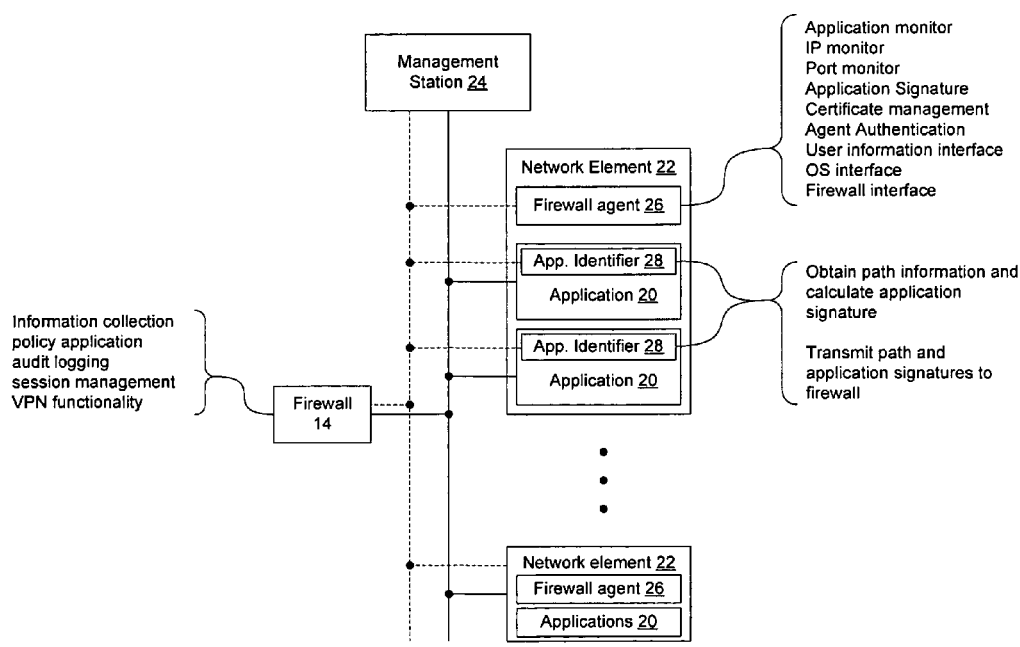
FIG. 2 is a functional block diagram of a local area network including a distributed firewall system according to an embodiment of the invention.

FIG. 2 illustrates the local area network 10 of FIG. 1 in greater detail, and illustrates components of a distributed firewall system according to an embodiment of the invention. As shown in FIG. 2, the local area network generally includes network elements 22 hosting applications 20 that allow users and other applications to take particular actions on the network or allow the local area network to have particular properties. The applications were discussed in greater detail above and a further discussion of the applications will thus not be provided in connection with FIG. 2. A network administrator may control operation of the network through a management station 24. Many types of management software packages and management stations have been developed to allow network operators to implement policy on the networks, and the invention is not limited to use with any particular type of management station or management software package nor does it require the use of a management station.

According to an embodiment of the invention, a distributed firewall system is created on the network to allow the firewall 14 (or 14') to control traffic propagation on a more granular basis. Using the distributed firewall system, traffic may be controlled on a per user, per user group, per application, or other basis. The distributed firewall system includes one or more firewalls 14 configured to control traffic on the network, one or more firewall agents 26 associated with network elements hosting applications, and one or more application identifiers 28 associated with applications running on the network. The distributed firewall system may be run on a communication network or on a virtual private network configured on the communication network, as descried in greater detail below. The firewall agents collect information and forward it to the firewall to allow more intelligent decisions to be made by the firewall, which may be used to control the types of traffic that can propagate through the firewall or the types of traffic that shouldn't be allowed to propagate through the firewall. By collecting additional information about applications and/or application users, and making that information available to the firewall, additional policy decisions may be made by the firewall to increase the level of control the firewall may exert over traffic on the network and thus the security of the network. Each component of the distributed firewall system will be discussed in greater detail below.

One embodiment of a firewall that may be used in the distributed firewall system is illustrated in greater detail in FIG. 4 and will be discussed extensively below. Briefly, the firewall according to an embodiment of the invention is configured to receive information from firewall agents distributed on the network and to establish an environment in which the firewall is able to receive input from the firewall agents in a trusted manner. The firewall also is configured to inspect packets and other protocol data units on the network to apply policy. The firewalls may be implemented as stand-alone devices on the network, may be instantiated as processes in other network elements such as routers or VPN servers on the network, or otherwise may be configured to handle traffic on the network.

The firewall agent monitors applications to determine connection information, such as which ports are being used by the applications, which users are using the applications, and which IP addresses are being used. The firewall agent provides this information to the firewall so that policy may be enforced using this information and thus security enhanced.

By monitoring the IP addresses of users that are running a firewall agent, the firewall may restrict communication from/to particular IP addresses to only those times when a particular user is logged on to the Network Element at that source or destination address. This enhances security for the network by allowing the firewall to implement policy based on which user is attempting to communicate using the network instead of just implementing policy based on where the communication originated and/or its intended destination.

Providing port information to the firewall enhances security by ensuring that only the minimum number of ports are open on the firewall at any given time. For example, certain applications or application protocols such as Common Object Request Broker Architecture (CORBA), dynamically assign ports from a range of ports for a given communication session or for a given communication on the network. By monitoring the particular ports being used by an application, the firewall agent is able to instruct the firewall to open the particular port in use at the moment rather than requiring the firewall to have all ports in the range open all the time. Thus, the firewall is able to be instructed as to the particular port that it should open for the application. The firewall agent can also associate the user who is accessing the application to the port or ports the application is using. This allows the firewall to do more than just associate users with IP addresses (as discussed above), since the firewall can associate users with IP addresses as well as specific ports. This allows the firewall to further refine the user based decision making process discussed above.

Where the distributed firewall system is run across a VPN tunnel, the distributed firewall system may control the type of traffic that is placed onto the tunnel, even though the tunnel passes through the firewall and the packets on the tunnel are encrypted and, hence, not visible to the firewall. As described in greater detail below, VPN servers and VPN clients in the VPN environment may cooperate or be configured to implement aspects of the distributed firewall system, to thereby enable the distributed firewall system to be used in a VPN environment.

The firewall agent may collect user information from the operating system to determine the identity of the user and how the user was authenticated on the network. If the user has not been authenticated in a manner that establishes a sufficient level of trust, the firewall agent may opt to authenticate the user directly. The firewall agent will then pass the user's identity (and possibly other authentication information) to the firewall. The firewall may use this information to determine whether the user is authorized for various types of network access. By combining this information with the IP address and port monitoring, discussed above, particular users may be blocked from accessing particular applications on the network at the firewall rather than relying on each individual application to block access to unauthorized or unauthenticated users. This is advantageous as it reduces the number of elements in the network that must be secured and thus improves the security of the network while reducing the cost of security related maintenance, such as installing security updates, ensuring secure configurations, and other similar actions.

The firewall agent may also collect information on applications attempting to access the network and pass this information on to the firewall. This information could include application name, type, path information, timestamps, EP address and ports used, and checksums or signatures calculated based on the application. The firewall can then implement policy based on knowledge of which application is attempting to communicate from and to particular IP addresses and ports. This information can be combined with the user information discussed above to enable the firewall to implement policy based on which users are allowed to use which applications to and from which locations. The invention is not limited to firewall agents and firewalls that collect all of these types of data or implement policies based on all these types of data, as subsets may be used and other data or policy criteria may be added.

In the descriptions provided herein, the network element is described as having a single firewall agent to allow information to be passed to one firewall. The invention is not limited in this manner, however, as multiple firewall agents may be instantiated on a given network element to allow the network element to control operation of multiple firewalls, to provide redundancy, or to allow particular applications to be associated with particular firewall agents. Alternatively, the same firewall agent may be configured to interact with multiple firewalls to allow differential treatment of traffic by the different firewalls. For example, in the embodiment illustrated in FIG. 2, a security administrator may wish to have traffic treated differently depending on whether the traffic is to traverse zones or whether the traffic is to traverse between the internal and external network. Thus, one or more firewall agents may be instantiated to allow different traffic to be filtered by different firewalls and the invention is not limited to instantiation of a single firewall agent configured to interact with a single firewall.

In the distributed firewall system discussed herein, the firewall agent is not under the direct control of the firewall or secured by the firewall since these components will typically be instantiated in or close to where the applications are running on the network. Accordingly care should be taken to ensure that the distributed components are not tampered with or modified to prevent unauthorized access to the network from being obtained through these distributed components. If this were not the case, modification of the firewall agent would allow unauthorized users to obtain access to applications or other resources on the network. According to an embodiment of the invention, two levels of security are implemented. First, the firewall agent verifies the applications to ensure the firewall agent is interacting with the correct application, and second the firewall agent itself is verified to the firewall to allow the firewall to determine that the firewall agent has not been compromised. Using these security mechanisms allows the firewall to create a trusted federation of components to allow the distributed firewall system to securely administer policy on the network.

There are many ways of authenticating entities such as the firewall agent and applications, and the invention is not limited to any particular manner of performing the authentication or otherwise verifying the components of the distributed firewall system. For example, the firewall agent may collect application information and calculate a signature for the application. This signature can be compared with the signature computed for the application in a trusted state, so that the application identity can be confirmed. If the signature for an application changes, the firewall agent may determine that the application has been compromised and instruct the firewall to block access to the application and optionally notify the network operator. Thus, the firewall agent can prevent users from attempting to obtain access to the network or network application by modifying or replacing an application on the network element.

In addition to checking that the application is secure, the identity of the firewall agent may be authenticated to the firewall to enable the firewall to verify that the firewall agent has not been tampered with or replaced. For example, the firewall agent may use digital signatures, code signing, and/or certificates to authenticate with the firewall to ensure the agent has not been tampered with. Optionally communications between the firewall agent and the firewall may also be encrypted to further increase the level of security and protect the communications. The invention is not limited to a particular manner of verifying the firewall agent as numerous types of signatures and/or other means may be used to verity the firewall agent to the firewall.

Establishing procedures to allow the distributed components of the firewall system to establish a trusted relationship extends the security of a firewall to allow additional information to be collected in a secure manner. For example, in the embodiment discussed herein, the applications may supply information about port information in use by the application. If an attack were made at the application level, for example by trying to impersonate the application to cause the application to open an additional port or otherwise admit traffic for the unauthorized user, the application signing procedures discussed above would allow the firewall agent to detect that the application had been modified and hence should not be considered to be trustworthy. Similarly, if an attempt were made to try to impersonate the firewall agent, the certificates and signatures in use in the system would allow the firewall to detect the imposter and ignore any information that did not come from a trusted firewall agent.

In operation, when a policy is to be implemented on the firewall, such as when a new user or new application is to start communicating across the firewall, the firewall agent collects information about the user and may interact with the network's AAA server or other network service to authenticate the user and obtain authorization for the user to use the network application. The firewall agent collects information about the local application that the user is using, such as the application's name and signature, its host IP address, and any ports it uses. Additionally, the firewall agent will collect information about any remote IP addresses and ports with which the application attempts to communicate. All of this information is encrypted or signed by the firewall agent, and passed to the firewall along with a certificate authenticating the firewall agent to the firewall.

Upon receipt by the firewall, the agent's certificate is validated to verify the firewall agent's identity, then the data is decrypted and/or signature checked to ensure that the communication has not been tampered with. If both checks are valid the information is used by the firewall to allow communications to take place across the firewall.

In addition to providing enhanced information to the firewall to allow the firewall to make more granular decisions as to which traffic should be allowed to propagate through the firewall, the firewall may support other functions. For example, the firewall and/or firewall agents may support audit logging functions to enable an audit to be created of network activity. These audits may be used to track which network applications users have run, and the intended destination and origination of communications for particular users and groups of users on the network. The audits can help understand the usage patterns for network applications or to help identify or understand network attacks. These audit functions are an addition to the IP address, port, and protocol audit logging that traditional firewalls may provide.

Additionally, the firewall and/or firewall agent may support session management to enable a user or application's session to be tracked. This is useful, for example in connection with an attack on the network, to help allow the network operator to determine who's account or which application is being used in the attack. By allowing filtering based on specific information, the network operator may then instruct the firewall to block the particular attack by instructing the firewall to stop the particular user or application session rather than requiring all traffic or a general class of traffic to be blocked.

An ancillary benefit of employing firewall agents on network elements is that the firewall agents may be polled to perform a software inventory on the network. Specifically, the firewall agents maintain a database of available applications, and thus may be configured to respond to inquiries regarding the location and availability of applications on the network. Other ancillary benefits may be available as well and the invention is not limited to an embodiment including all or the specifically discussed advantages attributed to aspects of the invention discussed herein.

Although the distributed firewall system is described herein as having two separate components (the firewall agent and the firewall), additional components or different components may be used to collect information from the applications and pass the information to the firewall(s) as well and the invention is not limited to this particular implementation.

Figure 3:
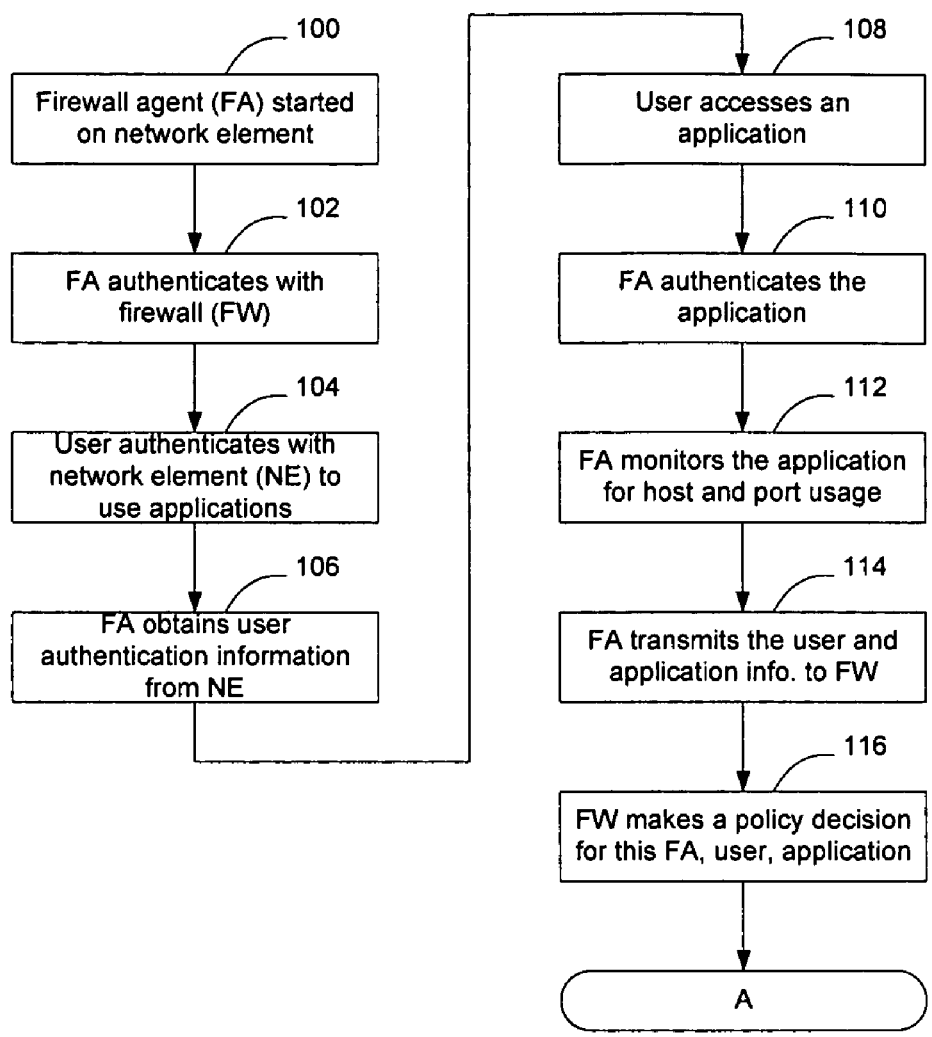
FIG. 3 is a flow diagram illustrating a process of controlling traffic propagation according to an embodiment of the invention.

FIG. 3 is a flow chart illustrating operation of the distributed firewall system according to one embodiment of the invention. As shown in FIG. 3, initially a firewall agent is started on the network element to enable communications associated with the network element to be inspected by the firewall (100). The firewall agent may be started when a network element is started on the network, when the network element undergoes a restart operation, or in other circumstances.

Once the firewall agent has been started on the network element, it authenticates itself with the firewall or firewalls with which it will interact (102). Authentication may be accomplished by causing the firewall agent to send a digital signature to the firewall, or may occur with the support of an AAA server or other network service, and the invention is not limited to the manner in which the firewall agent authenticates itself on the network or with the firewalls.

When users want to access one of the applications on the network element, the user authenticates with the network element to use the applications (104). Alternatively or additionally the user may authenticate with the firewall agent as well (106). In this context, the firewall agent may obtain information from the network or application as to how the users are to be authenticated and may collect user information and authentication information to verify that the users attempting to access the application are authenticated and/or authorized to do so.

Once the user has been authenticated, and the firewall agent is satisfied that the user is authentic, the user may access the application (108). In connection with accessing the application, the application will be authenticated to the firewall agent (110), for example by computing a digital signature for the application and comparing that digital signature with another signature obtained for the application while in a known trusted state. Other ways of ensuring the trustworthiness of the applications may be used as well and the invention is not limited to the particular methods discussed herein.

The firewall agent then monitors the applications running on the network element and monitors users of the applications to determine host and port usage information (112). This allows the firewall agent to determine parameters associated with the access, such as the IP addresses, MAC addresses, protocol, and port information that will be used by the user to access the application. Other types of information may be monitored as well. The firewall agent transmits the user and application information to the firewall (114), which may use this information to make policy decisions to control traffic on the network (116). For example, the firewall may use the firewall agent identification information, user information, and application information, to selectively allow or prevent traffic from being transported on the network.

The firewall agent may take other actions not shown in FIG. 3, such as to terminate applications and cause access to the applications to be blocked, as necessary or as directed by the network administrator, by causing traffic to the application to be blocked by the firewall or by causing the application to not provide services to the user. Optionally the firewall agent may be provided with privileges that will enable the firewall agent to terminate an application, although the invention is not limited to an embodiment that includes this functionality. Where the distributed firewall system traverses a VPN environment, the firewall agent may be associated with a VPN client on a host network element and the firewall may be associated with a VPN server, as discussed in greater detail herein. Thus, the embodiment illustrated in FIG. 3 is not limited to use with a firewall and firewall agent, but rather extends to other embodiments such as the embodiments illustrated in FIGS. 6-8.

Figure 4:
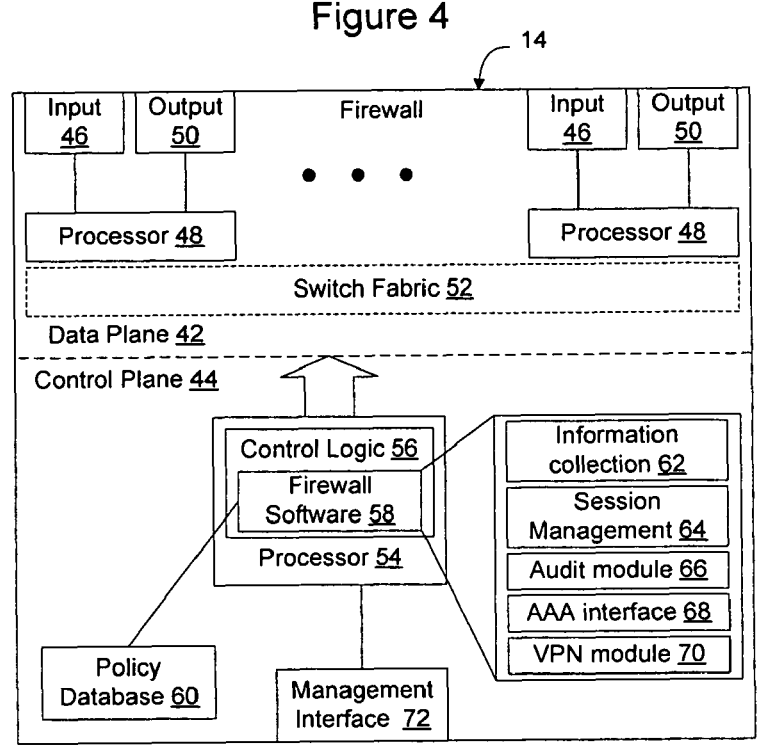
FIG. 4 is a functional block diagram of a firewall according to an embodiment of the invention.

FIG. 4 illustrates a firewall according to an embodiment of the invention. Although a specific embodiment of a firewall will be discussed in connection with FIG. 4, the invention is not limited to this particular embodiment as numerous architectures may be implemented to create a firewall that is able to operate with other associated entities in a distributed firewall system.

In the embodiment illustrated in FIG. 4, the firewall 40 includes a data plane 42 configured to handle traffic on a communication network and a control plane 44 configured to control operation of the data plane. The data plane may be optimized to handle data in packet form, frame format, or in other formats. In the following description it will be assumed that the data plane is optimized to handle packets of data, although the invention is not limited in this manner as other optimizations may be performed as well without departing from the scope of the invention.

As shown in FIG. 4, packets are received over one of the input ports 46, and are passed to a processor 48 for inspection. The processor applies filter rules as instructed by the control plane and otherwise enforces network policy by inspecting packets and searching for authorized or unauthorized traffic. Once inspected, packets to be passed over the network are sent to an associated output port 50. Packets associated with traffic to be filtered may be discarded, logged, transmitted to the control plane for further attention, or otherwise disposed of by the processor. Optionally a switch fabric 52 may be provided to interconnect the processors and/or input/output ports to enable the packets to be switched or routed between ports on the firewall. In this instance, the firewall software may be implemented in a router or router functionality may be implemented in the firewall, to enable the network element forming the firewall to perform additional services on the network. The invention is not limited to an embodiment that also is configured to switch or route packets, however.

The control plane 44 is configured to provide the data plane 42 with instructions regarding how packets should be handed by the firewall and to implement network policy and user/application specific rules on the network. For example, the control plane may include a processor 54 having control logic 56 configured to execute firewall software 58 to enable filtering decisions to be made and implemented on the firewall. The firewall software 58 may interface a policy database 60 including network administrator policy as well as policy information passed to the firewall from the firewall agents and related to application specific, user specific, or other specific information associated with how the firewall software should instruct the data plane to handle particular types of traffic. Likewise, where the firewall is to interface with a VPN server containing firewall software, the VPN module 70 may be used to interface the VPN server.

The firewall software may have multiple subroutines or modules configured to implement specific aspects of the software. For example, the firewall software may include an information collection module 62 configured to collect information from the firewall agents as to particular types of traffic that should be filtered or particular types of traffic that should be allowed on the network. It may also have as session management module 64 configured to enable the firewall to track particular session activity so that individual sessions may be terminated or monitored as required.

The firewall software may also access an audit module 66 to enable the firewall software to keep track of changes to the policy database so that unauthorized changes to the policy database may be traced on the network. This enables user information or other information to be catalogued for use by the network administrator to allow further unauthorized changes to the policy database to be detected and hopefully prevented, and to allow previous unauthorized changes to be exposed.

The firewall software may also include an AAA interface 68 to allow the firewall to have direct access to authentication and authorization information, and optionally access to accounting information to enable appropriate accounting entries to be made for access to particular applications by the users. Additionally, where the firewall is to participate in handling VPN traffic, optionally as an end-point to VPN tunnels on the network, the firewall may include a VPN module 70 configured to support creation and termination of VPN tunnels.

A management interface 72 may be provided to enable the network administrator to take action on the firewall. The management interface may be connected to a separate management network and have a separate management port. Alternatively, management of the firewall may occur over the data network through one or more of the input/output ports through the implementation of filter rules in the processor(s) that will cause management traffic to be filtered and forwarded to the control plane. The invention is not limited to the manner in which management communication is handled between the firewall and the management station.

Figure 5:
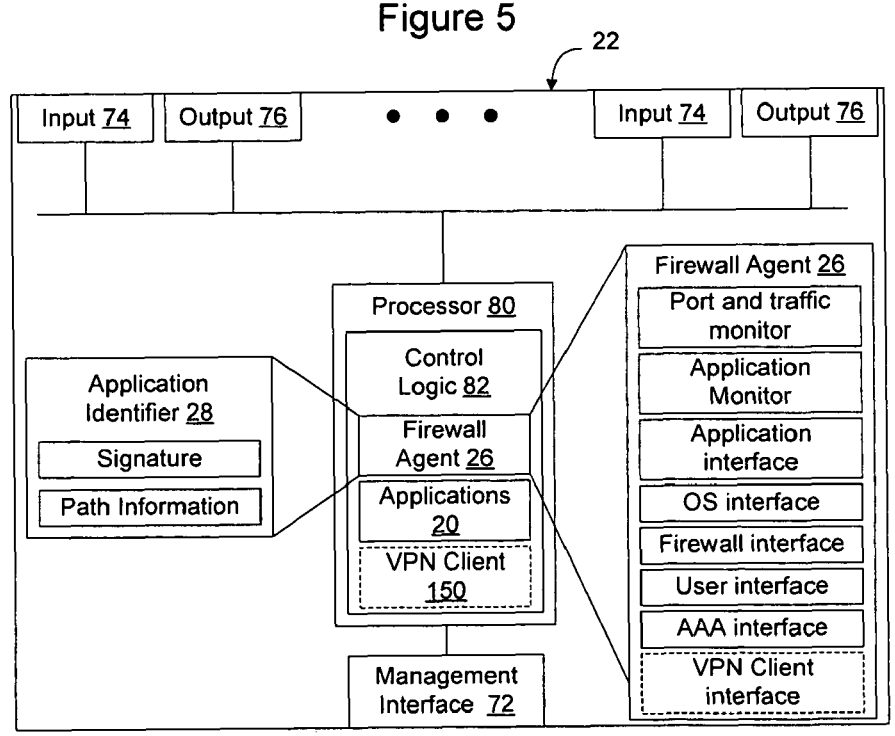
FIG. 5 is a functional block diagram of a network element according to an embodiment of the invention.

FIG. 5 illustrates an example of a network element configured to host applications and implement one or more firewall agents according to an embodiment of the invention. As shown in FIG. 5, a network element configured to host applications may have one or more input ports 74 and output ports 76 configured to interface a network and provide services on the network. The input/output ports may be conventional ports. For example, where the network to be interfaced is an Ethernet network, the network ports may be standard Ethernet ports.

The network element also includes a processor 80 containing control logic 82 configured to implement applications 20 and at least one firewall agent 26. The applications may contain subroutines, objects, or other programming modules to enable the applications to perform one or more functions or services on the network.

The firewall agent may contain subroutines, objects, or other programming modules to enable it to identify applications, compute digital signatures for the applications, and otherwise perform functions described herein in connection with the application identifier 28. The firewall agent may also contain modules to enable it to receive port and traffic information from the application, monitor the application and interface with the application, to allow the firewall agent to provide the firewall with application specific information. The firewall agent may also have interfaces with other entities on the network element or network. For example, the firewall agent may include an operating system interface to allow the firewall agent to determine how users are authenticated on the network. The firewall agent may also have a firewall interface configured to establish a secure channel to the firewall, a user interface to allow user information to be collected by the firewall agent, and an AAA interface to allow the firewall agent to work in connection with an AAA server to authenticate users, obtain authorization information, and log accounting entries on the network.

Other modules may be used as well, and the invention is not limited to the embodiment illustrated in FIG. 5. For example, where the network element is configured to host a VPN client to enable the network element to communicate over a VPN tunnel (as described in greater detail below) the firewall agent may also have a VPN client interface configured to facilitate integration between the VPN client and the firewall agent software. Optionally, these components may be tightly integrated or combined into one application. The firewall agent and application identifier may be formed as a single process or, alternatively, may be formed as separate processes on one or more network elements.

Figure 6:
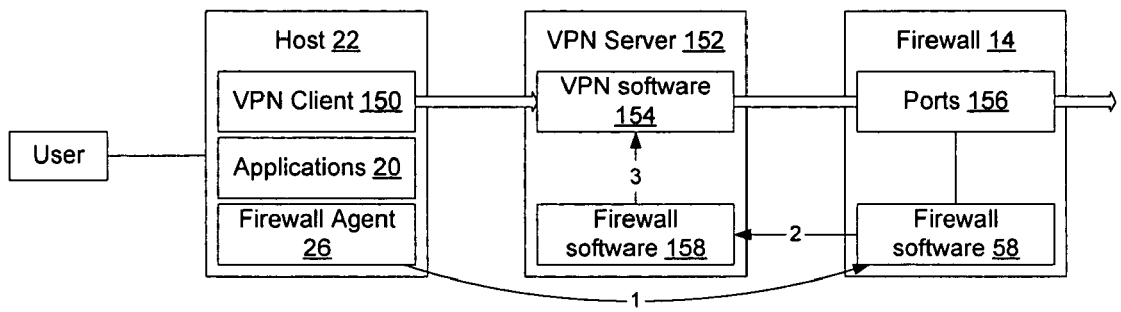
FIGS. 6-8 are functional block diagrams of a distributed firewall system configured to operate in a virtual private network environment according to embodiments of the invention.

FIG. 6 illustrates another embodiment of the invention in which the distributed firewall system is configured to operate in a Virtual Private Network (VPN) environment in which traffic from the applications may be encrypted, encapsulated, or otherwise transported over a VPN tunnel over the network and, optionally, through the network firewall 14. In this environment, the firewall 14 may not be able to control traffic on a per application or per user basis since it may be prevented, by the nature of the VPN technology, from inspecting the traffic being carried on the tunnel. This presents a potential danger to the network being protected by the firewall, since the firewall cannot discern which traffic for the VPN should be admitted to the network and which traffic should be prevented from being transmitted onto the network. For example, assume that the host network element is infected with a virus or other malevolent application. Once access is given to the host by a VPN server, all traffic for the user, including traffic associated with the virus, may traverse the firewall.

According to an embodiment of the invention, the distributed firewall system may be configured to encompass the end points of the VPN tunnel to allow policy to be implemented at the point of entry to the network. Thus, for example, where the VPN tunnel point of entry is a VPN server terminating the tunnel, the distributed firewall system may be configured to cooperate with the VPN server to inspect traffic at that point of entry to the network.

FIG. 6 illustrates an embodiment of the invention in which the distributed firewall system extends to interface with a VPN server, and optionally with a VPN client application, to allow enhanced control over users and applications that are communicating on the network using a VPN service.

As shown in FIG. 6, a host network element 22 having applications 20 and one or more firewall agents 26 is configured, in this embodiment, with a VPN client 150 to allow the host network element to communicate using VPN services provided by a VPN server 152. The VPN server may include conventional VPN software 154 (or alternatively VPN hardware) configured to encapsulate and/or encrypt communications on behalf of the host 22 to allow the communications to be carried on a VPN tunnel on the network. Although some firewalls permit VPN traffic to be inspected, by causing the firewall to act as a termination point for the VPN tunnel, other VPN configurations require the VPN tunnel to traverse the firewall. This is typically implemented by causing the firewall 14 to open one or more ports 156 for traffic on the VPN.

As shown in FIG. 6, according to an embodiment of the invention, the firewall agent 26 provides the firewall software 58 on the firewall 14 with information about the users and applications that will be communicating using the VPN services provided by the VPN server 152. This communication (illustrated by arrow 1 in FIG. 6) may take place in the manner described in greater detail above. Optionally, the firewall agent may also provide information about the VPN client to be used to handle communications for the user and/or applications.

In operation, once the firewall has made a policy decision for the user and application, it passes the policy decision to firewall software 158 on the VPN server 152 (arrow 2 in FIG. 6). By passing the policy decision to the firewall software on the VPN server, central control over the traffic may be maintained by the firewall, while implementation of the policy may be performed at a point in the network where the traffic is possible to inspect and control. The firewall software interacts with the VPN software to implement the policy, such as by preventing particular traffic from being put onto the VPN tunnel by the VPN server (arrow 3 in FIG. 6). Optionally, the firewall 14 may also instruct the firewall agent 26 that particular traffic is not authorized, and instruct the firewall agent to block the traffic at the host, either by interfacing with the applications 20 or with the VPN client 150. For traffic that is to be allowed to be carried on the VPN, the traffic may be encapsulated/encrypted and carried on a VPN tunnel on the network. Since implementation of the firewall policy decision is performed in the VPN server, the VPN tunnel may be allowed traverse the firewall without compromising the firewall's ability to maintain control over traffic into and out of the network.

Figure 7:
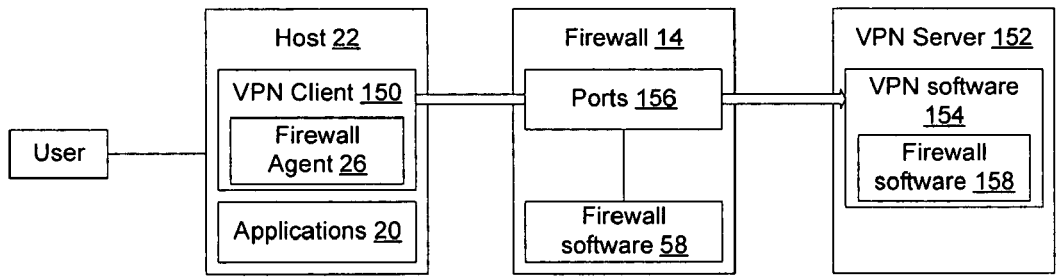

FIG. 7 illustrates another embodiment in which the VPN server is disposed behind the firewall or co-located with the firewall. In this embodiment, the VPN client 150 implements the functions of the firewall agent 26, such as monitoring users and applications. Firewall software 160 associate with the VPN server's VPN software is configured to implement network policy on behalf of the firewall. Specifically, in this embodiment the VPN server includes VPN software configured to enable VPN tunnels to be set up with VPN clients established on host network elements. The firewall agent may be implemented on the host network elements, either as part of the VPN client or as an independent process and interfaced to the VPN client, to allow application and user information to be passed over the VPN tunnel to the VPN server. The VPN server implements VPN software 154 to support the creation and maintenance of VPN tunnels on the network and also includes firewall software to enable firewall functions to be performed by the VPN server. Where the VPN server is integrated with the firewall, the firewall software functions may be performed by the firewall. Where the VPN server is disposed behind the firewall on a separate network element or is configured as an independent process running behind the firewall, the firewall software may be provided to implement policy based on the information received over the VPN tunnel from the VPN client/firewall agent associated with that tunnel. Allowing the firewall information to traverse the network firewall allows the firewall information to be transported securely on the network. Enabling firewall policy implementation to be performed by the VPN server enables specific traffic on a VPN tunnel to be filtered at the VPN server at the point of entry to the network before the traffic is able to enter the network.

Figure 8:
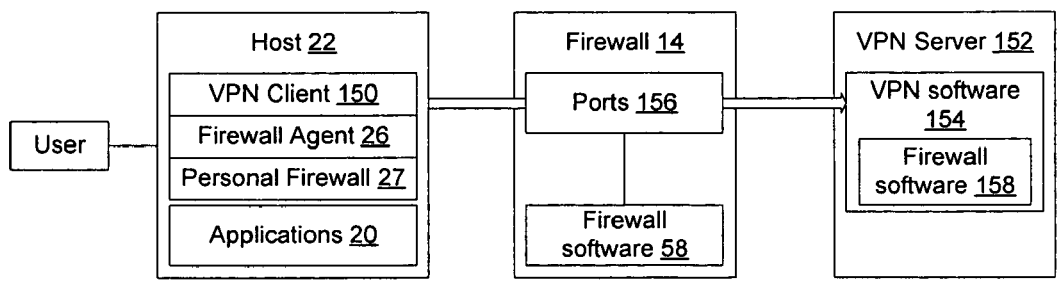

FIG. 8 illustrates another embodiment of the invention in which a personal firewall 27 is integrated with the VPN client 150 and/or firewall agent 26. Integrating a personal firewall with one or more of these additional components facilitates monitoring users and applications on the host 22. Specifically, since personal firewalls are conventionally available and are able to monitor applications on a single computer device, integrating the monitoring capabilities of the personal firewall with the distributed firewall capabilities provided by the firewall system discussed herein, may allow the firewall agent code to be simplified since an independent application monitoring program may be omitted. In this embodiment, monitored application and user information is passed from the personal firewall to the firewall agent, which then passes this information or other information derived from the received information over the VPN tunnel to the VPN server 152 in a manner similar to FIG. 7.

In the embodiments illustrated in FIGS. 6-8, the software modules may be implemented on control logic on one or more processors on the several network elements or, alternatively, one or more of these components may be implemented in hardware, firmware, or other similar structure. The invention is not limited to the use of software on the network elements as other embodiments are possible as well.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The control logic may be implemented as a set of program instructions that are stored in a computer readable memory within the network element and executed on a microprocessor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic also can be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of controlling traffic on a communication network, the method comprising the steps of:
    verifying an identity of a firewall agent to a network firewall;
    obtaining, by the network firewall, information from the firewall agent configured to collect information about at least one of user and application activity, and
    adjusting filtering rules to be applied by the network firewall at least in part based on the information from the firewall agent.

2. The method of claim 1, wherein the information comprises at least one of port usage and Internet Protocol (IP) address usage.

3. The method of claim 1, wherein the information comprises user data and application data, and wherein the user data comprises information associated with a host that the user has logged into and wherein the application data comprises information associated with which applications the user is running.

4. The method of claim 1, wherein the network firewall is configured to filter traffic on the communication network based on the filtering rules.

5. The method of claim 1, wherein the network firewall is instantiated in a first network element on the communication network, and wherein the firewall agent is instantiated on a second network element on the communication network.

6. The method of claim 5, wherein the application is instantiated in the second network element.

7. The method of claim 1, wherein the application is configured to dynamically assign ports to communication sessions on the communication network, and wherein the information comprises at least current port assignment information.

8. The method of claim 7, wherein the step of adjusting filtering rules to be applied by the network firewall comprises opening a port on the network firewall based on the current port assignment information.

9. The method of claim 1, wherein the information from the firewall agent comprises user information.

10. The method of claim 9, further comprising the step of validating, by the firewall agent, the user information.

11. The method of claim 10, wherein the step of validating comprises interfacing, by the firewall agent, an authentication server.

12. The method of claim 1, further comprising the step of providing, by the firewall agent, user information.

13. The method of claim 12, further comprising the step of signing, by the firewall agent, the user information.

14. The method of claim 1, wherein the step of verifying the identity of the firewall agent comprises providing a digital signature from the firewall agent to the firewall.

15. The method of claim 1, wherein the network firewall comprises a plurality of distributed components, one of said components being associated with a VPN server, the method further comprising the step of passing the filtering rules to the component associated with the VPN server.

16. A distributed firewall system, comprising:
    at least one firewall agent configured to collect information about at least one application configured to provide services on a communication network; and
    a firewall appliance configured receive at least a portion of the collected information and to apply filter rules to network traffic on the communication network, said filter rules being adjustable based at least in part on the received information;
    wherein the firewall agent and firewall appliance are configured to exchange collected information in a secure and trusted manner.

17. The distributed firewall system of claim 16, wherein the collected information is port and Internet Protocol address information.

18. The distributed firewall system of 16, further comprising at least one application identifier associated with the application and configured to provide path information and application signature information to the firewall agent.

19. The distributed firewall system of claim 16, wherein the firewall agent is instantiated on a first network element, the firewall appliance is instantiated on a second network element, and wherein the firewall agent is configured to perform an application inventory indicative of applications running on the first network element.

20. The distributed firewall system of claim 16, wherein the firewall agent is configured to audit user and application information.

21. The distributed firewall system of claim 16, further comprising firewall software associated with a VPN server on the network, said firewall software being configured to allow the VPN server to be configured to apply firewall policy to VPN traffic.

* * * * *